United States Patent [19]
Freeman

[11] 4,147,299
[45] Apr. 3, 1979

[54] AIR FLOW SYSTEM FOR A DISK FILE
[75] Inventor: Marshall E. Freeman, San Jose, Calif.
[73] Assignee: International Business Machines Corporation, Armonk, N.Y.
[21] Appl. No.: 836,459
[22] Filed: Sep. 26, 1977
[51] Int. Cl.$^2$ .................. H01B 7/34; H01L 25/04
[52] U.S. Cl. .................................. 236/49; 98/33 R; 165/16; 361/381; 55/217
[58] Field of Search .................. 236/49; 310/63, 56; 98/33 R; 165/16, 40; 361/384; 174/16 R; 357/82; 55/217

[56] References Cited
U.S. PATENT DOCUMENTS

| | | | |
|---|---|---|---|
| 1,972,315 | 9/1934 | Ramey | 310/56 |
| 2,167,472 | 7/1939 | Bedford | 236/49 |
| 3,740,735 | 6/1973 | Gabor | 55/385 X |
| 3,870,227 | 3/1975 | Attridge, Jr. | 165/16 X |

*Primary Examiner*—William E. Wayner
*Attorney, Agent, or Firm*—Richard E. Cummins

[57] ABSTRACT

An air flow system for a disk file is disclosed in which air is pumped under pressure past the disk surfaces to remove contaminants and past a voice coil actuator to cool the motor and returned to an inlet in the pump. A thermostatically controlled air diverter is placed in the air circulating path to reduce the range of temperature change in the disks and thus minimize the track misregistration problems which might occur as a result of differential thermal expansion of the disks and related components. The thermostatically controlled diverter valve functions to control the volume of normally lower temperature ambient air entering the system by controlling the volume of air exhausted from the system in accordance with the temperature of the air being circulated.

The system functions as a closed loop system at startup time allowing a faster warmup period and can operate as a completely open loop system if the ambient temperature is relatively high, the degree of openness of the system being a function of the ambient temperature and the amount of heat being dissipated by the components being cooled.

5 Claims, 4 Drawing Figures

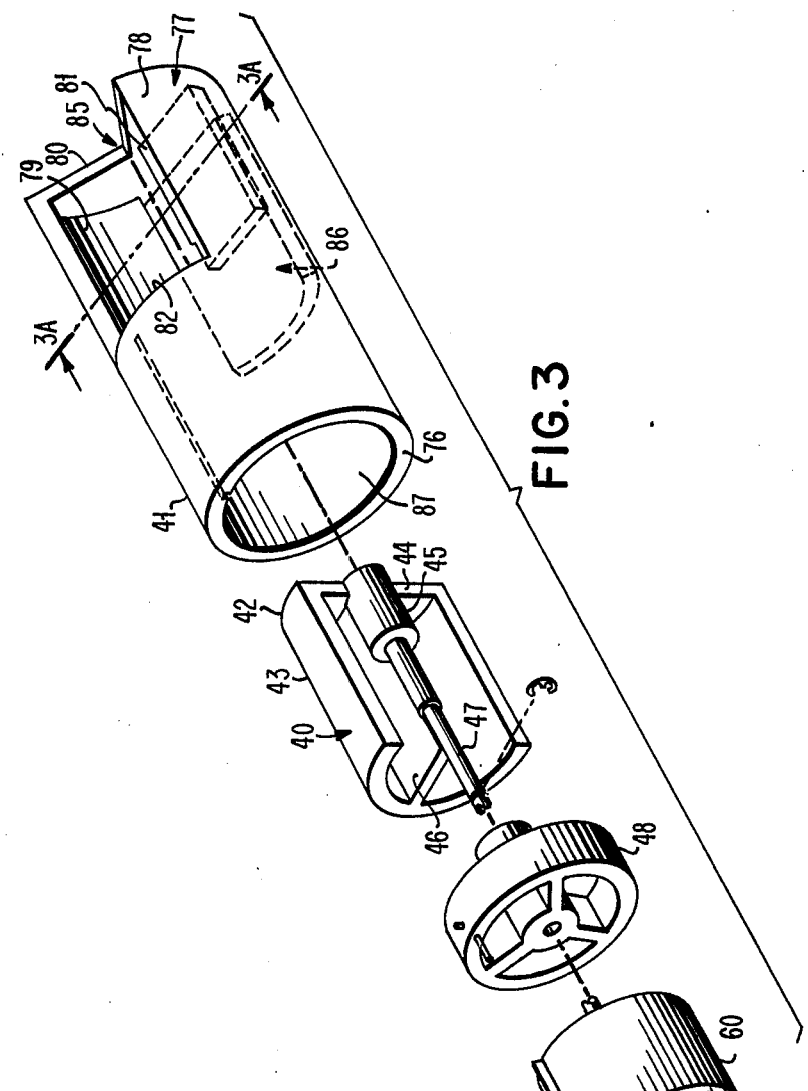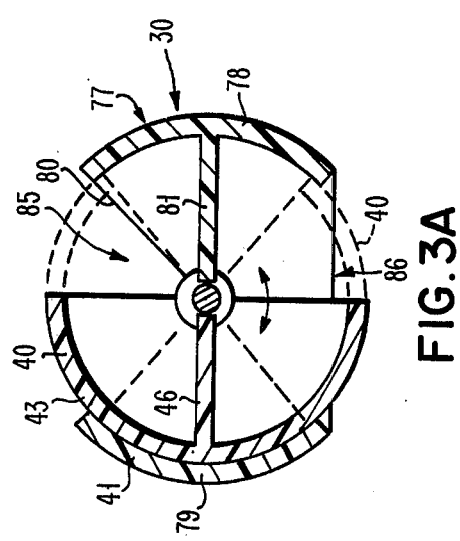

AIR FLOW SYSTEM FOR A DISK FILE

PRIOR ART

In prior art disk files, the need to maintain a contaminate-free environment to prevent an air-bearing head from "crashing" on the rotating magnetic disk is well known. Several different arrangements have been proposed which solve the contamination problem. In one arrangement, air is pumped into the disk enclosure through one or more filters and exhausted to atmosphere after being passed over the disk surfaces. Such an arrangement provides for a positive pressure within the disk chamber of pure filtered air. One disadvantage of such an open loop system is that the life of the filter is relatively short since it is continually being exposed to ambient air with various levels of contaminants so that it is difficult to predict when to replace the filter.

Another approach to maintaining a contaminant free environment in the disk enclosure is to provide a closed loop system where, in effect, the same air is continually circulated throughout the enclosure, generally through a filter, to remove any of the internally produced contaminants. Such an arrangement improves filter life, but if the air is also used to cool components in the disk assembly, consideration has to be given to the amount of heat which will be generated and the effect of that heat on the operation of the device. In addition, if the system is not perfectly sealed, provision must be made for adding new air.

As track densities increase, the temperature of the disk environment becomes increasingly important. In many disk systems, the magnetic heads are positioned in accordance with signals derived from a servo head reading servo tracks on a dedicated servo surface of the disk stack which normally involves several disks. The head positioning system acting in response to the servo signals functions to maintain the heads on their associated data tracks which lie in the same imaginary cylinder as the servo track. It has been recognized in the art that this imaginary cylinder is affected by temperatures such that each disk responds slightly different to a change in temperature. Likewise, each head arm assembly also responds differently so that, even if the servo head-servo disk is used as a reference through a wide temperature range, each data head-data surface combination responds differently throughout that temperature range resulting in what is referred to as "track misregistration" or TMR.

When the track densities are in the range of 500 to 750 tracks per inch, track misregistration over normal operating ranges of the disk drive results in the data head being positioned off track an amount sifficient to prevent reliable reading of data. One recently suggested solution to track misregistration problems where track densities are relatively high, involves the use of prerecorded sectors of servo information interleaved with data sectors. The track-following operation in this type of arrangement, employs the servo signals recorded on each track to follow that track. While such an arrangement allows data to be read accurately over large ranges in temperaturechanges, the solution is relatively expensive in that storage space normally available for data now has to be occupied by servo data on each track.

SUMMARY OF THE INVENTION

The present invention provides an air flow system for a disk file wherein the range of temperatures experienced by the components which contribute to track misregistration problems is controlled by means of an air flow diverter valve which functions to divert a predetermined portion of the air being circulated throughout the system to atmosphere in accordance with the temperature of the air. The valve is positioned relative to the intake plenum of the blower and the source of ambient air such that the volume of cooler make-up air taken into the system is directly related to the volume of warmer air diverted out of the system. The diverter valve, by exhausting a portion of the air stream into atmosphere, functions to convert the velocity pressure at its input into a below ambient pressure in the air intake plenum of the blower. This action permits new make-up air which is at atmospheric pressure and ambient temperature to be drawn into the intake plenum through a pre-filter in an amount directly proportional to the amount of air being exhausted.

One object of the present invention is to provide an air flow system for a disk drive which permits the temperature of the air being circulated throughout the system to be controlled.

Another object of the present invention is to provide an air flow system for a disk drive which operates as a closed loop system during startup and automatically as an open loop system above some predetermined temperature.

A further object of the present invention is to provide an air flow system for a disk file in which the amount of new air supplied to the system through a filter is kept to a mininum volume necessary to maintain the temperature of the air within a predetermined temperature range, thereby extending the life of the filter.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 3 is perspective view of the temperature responsive air flow diverter shown diagrammatically in FIG. 1;

FIG. 3A is a section of the valve shown in FIG. 2 taken along the line AA.

DESCRIPTION OF THE PREFERRED EMBODIMENT

Figures 1, 2:
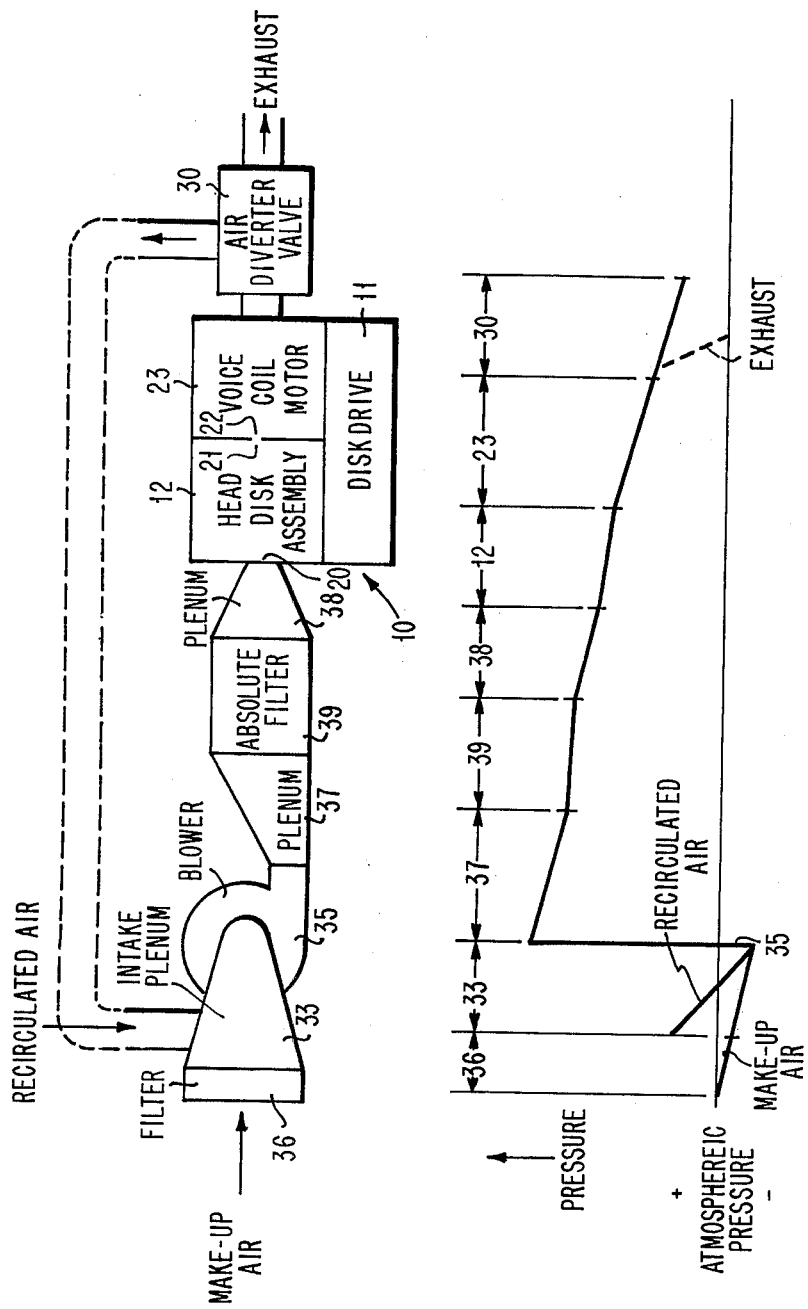
FIG. 1 illustrates diagrammatically one embodiment of an air flow system for a disk file employing a temperature responsive air flow diverter in accordance with the teachings of the present invention.
FIG. 2 is a pressure profile of the system shown in FIG. 1.

The air flow system and disk file are shown diagrammatically in FIG. 1. The file 10 consists of a disk drive portion 11 and a head disk assembly 12. The head disk assembly may be of the type shown in U.S. Pat. Nos. 3,973,273 and 4,034,411 wherein a stack of magnetic disks are mounted to a rotatable spindle and a magnetic head carriage assembly is movable radially relative to the axis of the spindle. The head disk assembly is positioned on the disk drive such that the disk spindle is rotated by a motor in the drive. The head carriage assembly is positioned by means of a voice coil actuator also mounted permanently on the disk drive. The head carriage assembly may be connected mechanically to the coil of the voice coil motor as in U.S. Pat. No. 3,973,273 or the coil of the VCM may be permanently attached to the head carriage assembly of the head disk assembly as in U.S. Pat. No. 4,034,411.

In either case, the head disk assembly 12 is a closed chamber except for an air inlet port 20 and an air outlet port 21 which connects to a corresponding inlet port 22 of the enclosure of the VCM 23. Air supplied to the head disk assembly inlet port 20 from the air flow system functions to maintain the disks at the desired temperature range while cleaning contaminants from the surface of the disks and related components contained within the enclosure. The air leaves the head/disk assembly enclosure 12 and passes to the voice coil motor enclosure 23 where it functions to cool the coil of the voice coil motor and associated electrical components.

The output port of the VCM is supplied to a temperature responsive air diverter valve 30 shown in detail in FIGS. 3 and 3A and described later on in the specification. The overall function of diverter 30 is to divert a predetermined portion of the air stream exiting from the voice coil motor enclosure to atmosphere. The amount of air diverted varies from zero percent to 100 percent of the air stream, depending on the range of temperatures over which the file is desired to operate. Below a certain temperature the diverter valve is closed so that substantially all the air entering the valve at its inlet port is channeled to the intake plenum 33 of the blower 35. Above a certain temperature range 100 percent of the air is diverted to atmosphere. One surface of the intake plenum 33 is provided with a filter 36 such that when the pressure within the plenum 33 is below atmospheric because air is being exhausted to atmosphere, new make-up air is brought into the system through the filter 36. However, if the pressure is at atmospheric pressure or slightly above because the diverter 30 is closed, no new air is added to the system.

The output of the blower 35 is connected to an absolute filter 39 whose function is to remove any contamination contained in the new make-up air which passes through the pre-filter 36 and remove any internally produced contaminants from the recirculated air.

Temperature responsive diverter 30 is shown in detail in FIG. 3. The diverter comprises a movable deflector assembly 40 and the stationary deflector housing 41. The housing 41 comprises a cylindrical member having one end portion 76 which defines the inlet port 87. The remaining portion 77 of the cylindrical member includes two partial cylindrical sections 78 and 79 and a base member 80. Sections 78 and 79 are diametrically opposed and their respective edges define the two outlet ports 85, 86 of the diverter. Each outlet port is substantially the same size as the inlet port 87 in order not to adversely affect the rates of static pressure and velocity pressure at this point in the system. The movable deflector assembly 40 as shown in FIG. 3 in an exploded view, comprises a movable deflector element 42 which has a semi-cylindrical shell 43 connected to a semi-circular base portion 44, a cylindrical center hub 45 connected to the base 44 and a partition 46 extending radially between hub 45 and shell 43 as shown in FIG. 3A. Partition 46 extends from base 44 upwardly towards the top of the shell.

With reference to FIG. 3A, partition 46 is position relative to partition 81 so as to define two separate air flow paths from the inlet opening 87 to the respective outlet ports 85, 86. The cross section of each air flow path is variable in size depending upon the position of the movable deflector partition 46 relative to the stationary partition 81. Further, the size of the outlet ports 85 and 86 also changes in proportion to the division of air flow since semi-cylindrical section 43 moves relative to associated output ports 85, 86 as assembly 40 rotates relative to housing 41. Shaft 47 is fixed within hub 45 by any suitable means such as a set screw. The other end of shaft 47 extends through hub 48 which is positioned in the housing 41. Shaft 47 and deflector 42 move as a unit relative to hub 48 and the housing 41.

A coil 60 of bimetal material has its inner end fixedly attached to shaft 47 and its outer end fixedly attached to the housing 41. As shown, a bimetallic coil is disposed coaxially in the input port 87 of the housing 41 so that the entire surface of the coil is exposed to the air entering the diverter from the voice coil motor enclosure 23. Bimetal coil 60 winds or unwinds in response to temperature changes. The action rotates deflector assembly 40 between two extreme positions relative to housing 41 such that all the air entering the diverter is either exhausted to atmosphere through the exit port 85 of the housing at one extreme or at the other extreme, the exhaust port 85 is completely closed by the cylindrical surface 43 of deflector assembly 40 so that all the air is directed to the intake plenum 33 of the blower 35. Depending upon the air temperature between the two extremes, a preselected percentage of air is exhausted.

The operation of the air flow system shown in FIG. 1 and the function of the air diverter valve can be seen by reference to FIG. 2 which is a plot of total pressure throughout the system beginning at the filter 36.

As shown in FIG. 2 the pressure at the blower inlet is slightly below atmosphere. Blower 35 increases the total pressure within the system at this point. As the air flows through the plenum 37 between the blower 35 and absolute filter 39 the total pressure decreases. The pressure continues to drop through plenum 38 between the absolute filter 39 and the head disk assembly enclosure 12. However, the total pressure within the HDA is still sufficiently above atmosphere to prevent any unfiltered air entering the system through bearings etc. The velocity of the air at the entrance to the HDA is also sufficient to dislodge any loose debris which might be generated internally of the HDA.

The air proceeds from the HDA through the VCM enclosure 23 with a decrease in pressure to the entrance of the air diverter 30. If the diverter valve 30 is closed so that no air is exhausted, the air pressure in plenum 33 adjacent the intake filter 36 remains above atmosphere so that no new air is added to the system. If, on the other hand, diverter valve 30 is positioned such that all the air is exhausted, the pressure within plenum 33 drops below atmosphere so that make-up air enters the system through intake filter 36.

The amount of new make-up air entering the system is a function of the total pressure in plenum 33 which is determined by the volume of air diverted to atmosphere by diverter 30.

While the invention has been particularly shown and described with reference to a preferred embodiment thereof, it will be understood by those skilled in the art that various changes in the form and details may be made therein without departing from the spirit and scope of the invention.

What is claimed is:

1. In an air flow system for a disk file in which air is supplied to at least one rotating magnetic disk to maintain the surfaces thereof free from contaminants which may be generated as a result of at least one magnetic transducer being in sliding contact with a disk surface and in which the same air is employed to cool components employed in the head positioning mechanism, an improved arrangement for controlling the temperature of the air being circulated through said air flow system, said arrangement comprising:
   (1) a blower having an inlet port and an outlet port;
   (2) an air intake plenum having (A) an outlet port connected to said inlet port of said pump, a first inlet port for receiving filtered air, and (B) a second inlet port for receiving recirculated air;
   (3) a filter disposed in said first inlet port of said air intake plenum operable to provide filtered make-up air for said system when the pressure in said intake plenum drops below atmospheric;
   (4) air flow diverter means including an inlet opening for receiving air circulated past said disk and said components of the head positioning mechanism; first and second outlet ports, one of which is positioned to exhaust circulated air to atmosphere and the other of which is connected to said second inlet port of said air intake plenum, and means responsive to the temperature of the air being circulated in said system for controlling the volume of air supplied to each said first and second outlet ports, whereby the pressure in said air intake plenum is varied above and below atmosphere, to control the volume of lower temperature make-up air added to the system.

2. The combination recited in claim 1 in which said diverter means comprises a stationary housing member defining an inlet port and first and second outlet ports and a movable member positioned relative to said housing, means attached to at least one of said members to divide the volume of air at said inlet port into two separate streams, and means for moving said members relative to each other so that the volume of air in each stream is a variable percentage of the total volume in response to the temperature of the air entering said inlet port.

3. The combination recited in claim 2 in which means for moving said members is a bimetallic coil having one edge connected to said movable member and the other edge connected to said housing member, with the axis of said coil disposed parallel to the direction of said air stream.

4. The combination recited in claim 1 in which said means for controlling said volume of air comprises an element responsive to the temperature of the air, a stationary partition disposed between said inlet opening and said outlet opening parallel to the direction of said air flow, a movable partition disposed relative to said stationary partition and said outlet openings to divide said inlet opening into two separate channels, and means for varying the size of each of said outlet openings in direct proportion to the division of said inlet opening by said partitions, said movable partition and said means for varying the size of said outlet ports being under the control of said temperature responsive element whereby the volume of air exhausted to atmosphere is related to the temperature of the air being circulated.

5. The combination recited in claim 4 in which said element is a bimetallic coil disposed with its axis parallel to the direction of the flow of said air in said intake port, said coil having one edge attached to said movable partition and its other edge attached to the portion of said diverter defining said inlet port.

* * * * *